(12) United States Patent
Jensen

(10) Patent No.: US 7,050,567 B1
(45) Date of Patent: May 23, 2006

(54) CALL MANAGEMENT SYSTEM USING DYNAMIC QUEUE POSITION

(75) Inventor: Roy A. Jensen, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/492,114

(22) Filed: Jan. 27, 2000

(51) Int. Cl.
*H04M 3/00* (2006.01)

(52) U.S. Cl. .............. 379/266.01; 379/265.13; 379/266.02; 379/309

(58) Field of Classification Search .......... 379/309, 379/266.01–266.1, 265.01–265.14
See application file for complete search history.

(56) References Cited

U.S. PATENT DOCUMENTS

| | | | |
|---|---|---|---|
| 5,134,652 A | 7/1992 | Brown et al. | 379/163 |
| 5,946,388 A | 8/1999 | Walker et al. | 379/266 |
| 6,389,400 B1 * | 5/2002 | Bushey et al. | 705/7 |
| 6,434,230 B1 * | 8/2002 | Gabriel | 379/265.01 |

FOREIGN PATENT DOCUMENTS

| | | |
|---|---|---|
| EP | 0740450 A2 | 10/1996 |
| EP | 0863651 A2 | 9/1998 |
| EP | 0982917 A1 | 3/2000 |

OTHER PUBLICATIONS

Jackson, James R.; "Queues With Dynamic Priority Discipline," Management Science, vol. 9, No. 1 (1961), pp. 18–34.

Perry, Mark et al.; "Performance Modeling of Automatic Call Distributors: Assignable Grade of Service Staffing," Proceedings of the International Switching Symposium, Yokohama, Oct. 25–30, 1992, vol. 2, Symp. 14, pp. 294–298.

* cited by examiner

*Primary Examiner*—William J. Deane, Jr.
(74) *Attorney, Agent, or Firm*—Sheridan Ross P.C.

(57) ABSTRACT

A call center includes functionality for dynamically positioning newly received calls within an established call queue. The calls are positioned within the queue based on predefined service objectives for call types supported by the call center and a length of time that other calls have already been waiting in the queue. In a preferred embodiment, when a new call is received by the call center, an analysis is performed for individual queue positions within the queue until a queue position is identified that meets a predetermined selection criterion. The new call is then placed within this queue position and subsequent calls within the queue are moved accordingly.

29 Claims, 5 Drawing Sheets

CALL MANAGEMENT SYSTEM USING DYNAMIC QUEUE POSITION

TECHNICAL FIELD

The invention relates generally to call centers and, more particularly, to call management techniques for use in call centers.

BACKGROUND OF THE INVENTION

A call center is a facility that processes telephone calls for an organization, usually using some level of computer control. Typically, the telephone calls handled by a call center are incoming calls from present or potential customers of the organization. The incoming calls are distributed among a number of agents within the call center who are each trained to handle certain types of incoming calls. A single call center will often support a large number of different call types. For example, a call center may be set up to receive calls relating to each of a multitude of different products, product types, or product families sold by the organization. Alternatively, or in addition, a call center might handle calls relating to different services or information dissemination functions provided by the organization. Some such services/functions include: taking product orders, providing customer service, providing pricing and/or availability information, or any of a variety of other functions. Other methods for defining call types in a call center can also be used.

It is often desirable that the different call types supported by a call center be handled differently from one another by the call center. For example, some of the call types may be deemed by the corresponding organization to be more important than other call types and hence are to be given more attention or better service by the call center. Thus, a service level target is often defined for each of the different call types supported by the call center to indicate a desired level of service for the call type. However, past techniques for achieving the desired service levels for each of the call types supported by the call center have generally been inadequate. In one prior approach known as priority queuing, for example, a number of priority values are defined for different call types coming into a call center. A single call queue is then used to process calls having a variety of different call types. When a new call having a particular call type is received by the call center, the system determines the priority value associated with the new call and places the new call within a queue position based on the priority value. Thus, a call having a higher priority value is always placed in front of a call having a lower priority value in the queue. Therefore, if high priority calls are continually being received by the system, the lower priority calls within the queue can remain unanswered for an indefinite period of time. Such calls are often abandoned in frustration by corresponding callers.

Therefore, there is a need for a method and apparatus for managing calls within a call center that is capable of accurately achieving service level objectives for different call types within the call center. In addition, or alternatively, there is a need for a method and apparatus for managing calls within a call center that does not leave certain callers waiting indefinitely for their call to be answered by call center personnel.

SUMMARY OF THE INVENTION

The present invention relates to a system for use within a call center that dynamically positions newly received calls, having a number of different call types, within a single call queue to be addressed by agents within the call center. The system positions a new call within the queue based on, among other things, a service level objective associated with the new call and an amount of time that calls already within the queue have been waiting to be answered. Because the system takes into account the amount of time that other calls have been waiting to determine the queue position of the new call, less important calls are not left waiting indefinitely when a continuous stream of more important calls is being received by the call center. In addition, because the service level objectives associated with the incoming calls are also considered in the positioning decision, the system is capable of achieving service level target values to a relatively high degree of accuracy.

In one embodiment of the invention, when a new call is received by the call center, an analysis is initiated for a first queue position within the call queue to determine whether the new call should be placed in that queue position. The analysis for the first queue position includes the calculation of a ratio between an estimated total time that a call will be waiting in the queue and a service level target value associated with the call. The estimated total wait time is calculated as the sum of an expected remaining wait time for the call and a time period that the call has already been waiting in the queue. Using the ratio formula, a first quality value is generated to characterize the situation where a call currently positioned within the first queue position remains in the first queue position. A second quality value is also generated to characterize the situation where the new call is placed in the first queue position, replacing the current call. The first and second quality values are then compared to determine whether the new call should be placed in the first queue position.

If it is determined that the new call should not be placed in the first queue position, an analysis is then performed for a next successive queue position within the call queue. This process is continued until a queue position is identified for the new call. After a position decision has been made for the new call, the new call is placed within the identified queue position and the call formally occupying that queue position, and all subsequent calls within the queue, are moved back one position in the queue. The procedure is then repeated for each new call received by the call center.

DETAILED DESCRIPTION

Figure 1:
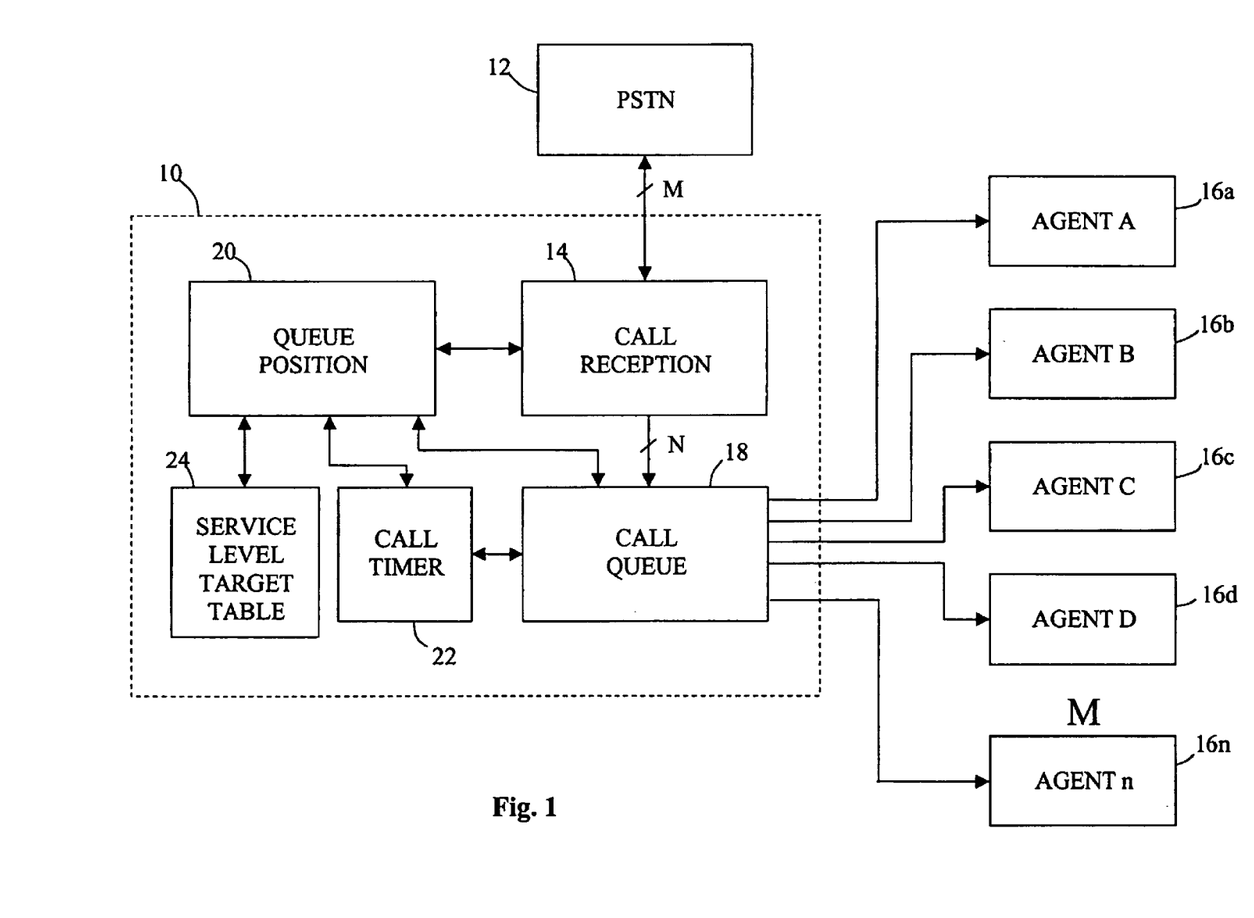
FIG. 1 is a block diagram illustrating a call center in accordance with one embodiment of the present invention.

FIG. 1 is a block diagram illustrating a call center 10 in accordance with one embodiment of the present invention.

The call center 10 can be used, for example, to service telephone calls coming into an organization or business. As illustrated, the call center 10 is coupled to a public switched telephone network (PSTN) 12 from which it receives incoming telephone calls from a plurality of remote entities. The call center 10 is also coupled to a plurality of agent stations 16a, 16b, 16c, 16d, . . . , 16n at which a number of human agents are positioned for handling calls received by the call center 10. The agent stations 16a, 16b, 16c, 16d, . . . , 16n can each include, for example, a desktop computer unit and a telephone headset to be worn by a corresponding agent.

The call center 10 receives calls from the PSTN 12 having a plurality of different call types. Each of the different call types has a service level target value associated with it that describes a desired service level that the corresponding organization wishes to provide for that call type. The service level target value for a call type can include, for example, a desired amount of time within which received calls having the call type are answered. Other types of service level target values are also possible. The call center 10 distributes the incoming calls among the agents located at the agent stations 16a, 16b, 16c, 16d, . . . , 16n based on, among other things, the service level target values associated with the calls. It should be appreciated that the PSTN 12 of FIG. 1 can be replaced by any type of communication network that is capable of supporting voice based communications.

As illustrated in FIG. 1, the call center 10 includes: a call reception unit 14, a call queue unit 18, a queue position unit 20, a call timer unit 22, and a service level target table 24. The call reception unit 14 is operative for receiving and holding incoming calls from the PSTN 12 and for determining a call type for each of the incoming calls. The call queue unit 18 maintains a queue of calls that are to be addressed by agents located at the agent stations 16a, 16b, 16c, 16d, . . . , 16n. The call timer unit 22 tracks the amount of time that each of the calls queued within the call queue unit 18 have been waiting (i.e., "time in queue" values associated with each of the queued calls). The service level target table 24 stores the service level target values for each of the call types supported by the call center 10. The queue position unit 20 determines the position that each new call received by the call reception unit 14 will assume within the call queue of call queue unit 18 based on a service level target value associated with the new call, service level target values associated with calls already in the call queue, and "time in queue" values of calls already in the call queue. Thus, new calls received by the call center 10 are "dynamically" positioned within the call queue.

It should be appreciated that the individual elements of the call center 10 of FIG. 1 are functional in nature and do not necessarily correspond to discrete hardware elements. For example, in one approach, two or more (or all) of the functional blocks illustrated in FIG. 1 are implemented in software within a common digital processor. Hardware implementations are also possible. For example, the call reception unit 14 can include conventional, computer-automated telephone equipment that is capable of receiving a call and placing it on hold until the call queue unit 18 determines that a connection is to be made to a particular agent. The call timer 22 can include separate hardware timer circuitry for tracking "time in queue" values for the queued calls. The service level target table 24 will preferably be located within a memory (e.g., a ROM, a RAM, a hard disk drive, etc.) associated with a digital processor implementing the queue positioning function and/or call queue function.

As described above, when a new call is received by the call reception unit 14, the call reception unit 14 determines a "call type" associated with the call. In general, an individual "call type" can include any form of call that an organization wishes to differentiate from other forms of calls, for whatever reason.

For example, an organization may wish to differentiate between calls related to different product families offered for sale by the organization. Many other ways of defining call types within a call center are also possible. The call reception unit 14 can determine the call type associated with a particular incoming call in any of a number of different ways. For example, in one approach, a caller is presented with an audio menu through which he/she designates the type of call being placed. In another approach, a unique telephone number is allocated to each different call type to be handled by the call center 10. In this approach, the call reception unit 14 determines the call type associated with a new call based on the line through which the call was received. A hybrid approach using both audio menus and multiple phone numbers can also be used. As can be appreciated, many other techniques for determining the call type associated with an incoming call are also possible.

After the call reception unit 14 determines the call type of a new call, it delivers the call type information to the queue position unit 20 for use in determining an appropriate position within the call queue of call queue unit 18 for the new call. In a preferred embodiment of the invention, each call type supported by the call center 10 is identified by a unique vector directory number (VDN). The queue position unit 20 keeps track of the VDNs for each of the calls queued within the call queue unit 18 within an associated memory. The service level target table 24 stores a service level target value for each of the VDNs supported by the call center 10. During call center operation, the queue position unit 20 retrieves service level target values for the new call and calls queued within the call queue unit 18 for use in determining an appropriate queue position for the new call. The queue position unit 20 also retrieves "time in queue" values for calls queued in the call queue unit 18 from the call timer 22 for use in determining the queue position for the new call. After the queue position unit 20 has determined a queue position for the new call, it delivers the position information to the call queue unit 18 which places the new call in the identified position.

Figure 2:
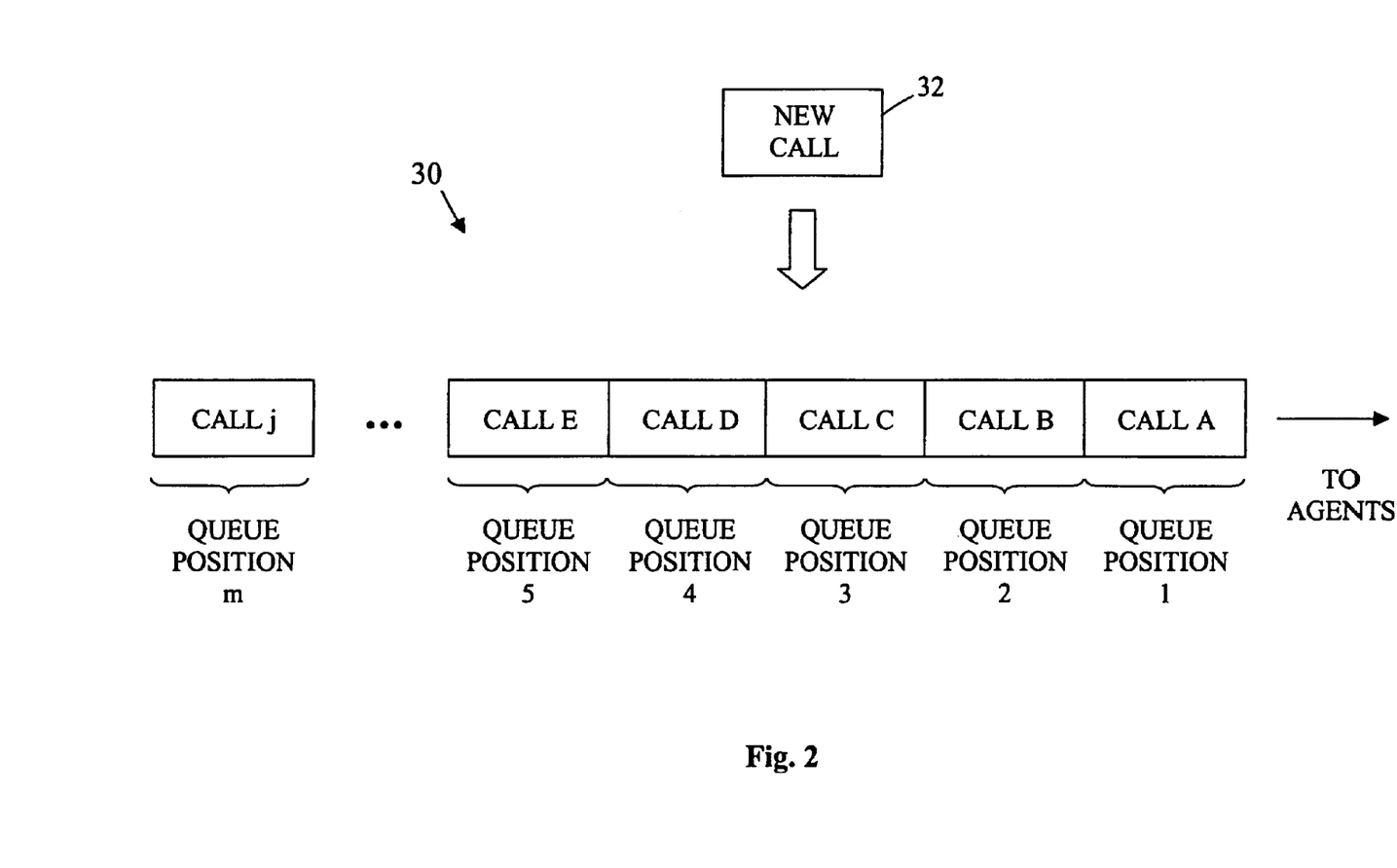
FIG. 2 is a diagram illustrating a call queue that can be implemented within the call center of FIG. 1 in accordance with one embodiment of the present invention.

FIG. 2 is a diagram illustrating a call queue 30 that can be implemented within the call queue unit 18 of FIG. 1. As illustrated, the call queue 30 includes a number of queue positions (i.e., queue position 1, queue position 2, etc.) in which individual calls waiting to be answered are located (i.e., call A is waiting in queue position 1, call B is waiting in queue position 2, etc.). When a call reaches queue position 1, it is next in line to be distributed to an agent at one of the agent stations 16a, 16b, 16c, 16d, . . . , 16n. That is, when a next agent becomes available, the call within queue position 1 (e.g., call A in FIG. 2) will be connected through to that agent (using, e.g., switching functionality within the call queue unit 18). All of the remaining calls then move up one position within the queue 30.

Figure 3:
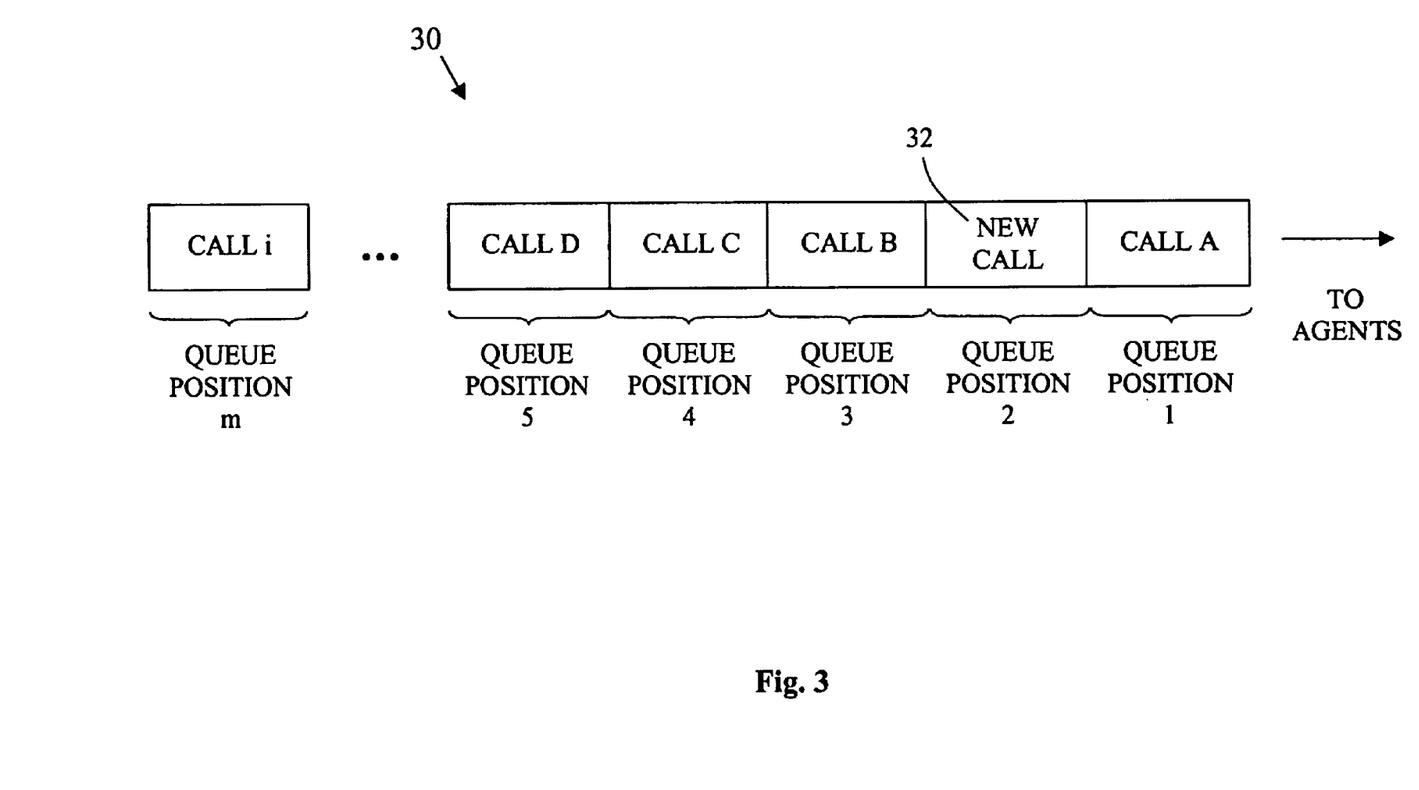
FIG. 3 is a diagram illustrating the call queue of FIG. 2 after a new call has been inserted within a second queue position therein in accordance with one embodiment of the present invention.

As described above, when a new call 32 is received by the call reception unit 14, the queue position unit 20 determines which queue position within the queue 30 the new call 32 is to be placed in. After the determination is made, the new call is placed within the selected position and the call formerly within that queue position (and all subsequent calls in the queue 30) is moved backward one position in the queue 30. For example, FIG. 3 is a diagram illustrating the queue 30 of FIG. 2 having the new call 32 inserted within queue position 2. Accordingly, call B and all subsequent calls in the queue 30 are moved back one position in the queue (i.e., call B is moved from queue position 2 to queue position 3, call C is moved from queue position 3 to queue position 4, and so on).

Referring back to FIG. 2, in one embodiment of the present invention, the queue position unit 20 performs an individual analysis for each queue position in the queue 30 starting at queue position 1 and moving backward one queue position at a time until a queue position is found in which to place the new call. For each queue position analyzed, the queue position unit 20 determines a first quality value corresponding to a current call within the queue position remaining in that queue position and a second quality value corresponding to the new call being placed within the queue position. The queue position unit 20 then compares the first and second quality values to determine whether the new call should replace the call currently within the subject queue position. The first and second quality values are generated using service level target values associated with the corresponding calls as well as "time in queue" information related to the calls.

In a preferred embodiment of the invention, the first and second quality values are calculated based upon a ratio between an expected total time in the queue for a particular call and a service level target value associated with the call. For example, for a current call in a particular queue position, the $$R = \frac{(\text{Weighted Advance Time} \times \text{Current Queue Position}) + \text{Time in Queue}}{\text{Service Level Target Value for VDN}}$$

ratio would be calculated as follows:
where the Weighted Advance Time is an estimate of the rate that calls are being drawn from the queue, the Current Queue Position is the number associated with the queue position currently being analyzed, the Time in Queue is the amount of time the current call has been waiting to be answered, and the Service Level Target Value for VDN is the target value associated with the VDN of the current call. The product in parentheses represents the "expected wait time" associated with the current call within the current queue position. That is, the estimated amount of time the current call will have to wait to be answered from this point forward. The numerator of the ratio thus represents the expected total time that the current call will spend within the queue if the call remains within the current queue position.

In a preferred embodiment of the invention, for a queue position currently being analyzed, the first quality value is calculated using the following equation:

first quality value=$|R_{NS}-R_{CC}|$ where $R_{NS}$ is the ratio corresponding to the new call being placed in the queue position subsequent to the current queue position, $R_{CC}$ is the ratio corresponding to the current call remaining in the current queue position, and the vertical lines represent the absolute value operator. The second quality value is calculated using the following equation:

second quality value=$|R_{NC}-R_{CS}|$ where $R_{NC}$ is the ratio corresponding to the new call being placed in the current queue position and $R_{CS}$ is the ratio corresponding to the current call being placed in the subsequent queue position. Because the absolute values of the differences are taken, the quality values are always positive values in the preferred embodiment. It should be appreciated that many other methods of calculating quality values can be used in accordance with the present invention.

As described above, the queue position unit 20 compares the first and second quality values to determine whether the new call should replace the current call within the current queue position. If the second quality value is less than the first quality value, the queue position unit 20 determines that the new call should replace the current call in the current queue position. The new call is then placed in the current queue position and all subsequent calls are moved back one position. If the second quality value is not less than the first quality value, the new call is not placed within the current queue position and the queue position unit 20 initiates analysis for the subsequent queue position in the queue 30. The queue position unit 20 then continues to analyze queue positions in the queue 30 until a queue position is identified for which the second quality value is less than the first quality value. If the end of the current queue is reached without the second quality value being less than the first, the new call is queued at the end of the queue.

With reference to FIG. 1, in one embodiment of the invention, the call queue unit 18 maintains a single queue for all call types supported by the call center 10. The calls from this single queue are then distributed among the agents at the agent stations 16a, 16b, 16c, 16d, . . . , 16n. Thus, the individual agents are not limited in the number of call types that they can receive (i.e., each agent can receive all types of calls). In an alternative approach, the call queue unit 18 maintains a number of different queues that each service a plurality of different call types. In this approach, each queue can be assigned a corresponding plurality of agents or each queue can be serviced by all of the agents.

Figure 4:
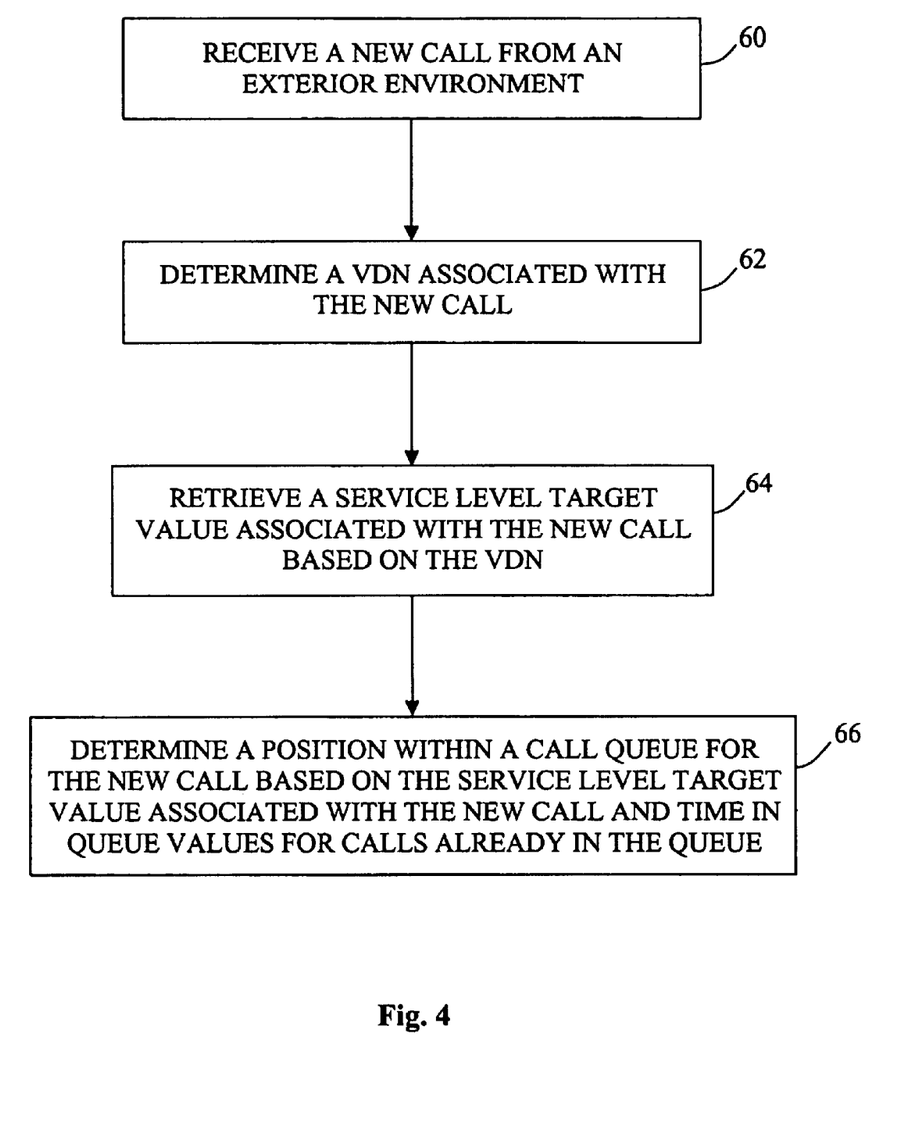
FIG. 4 is a flowchart illustrating a method for managing incoming calls within a call center in accordance with one embodiment of the present invention.

FIG. 4 is a flowchart illustrating a method for managing incoming calls within a call center in accordance with one embodiment of the present invention. First, a new call is received at the call center from an exterior environment (step 60). A VDN is then determined for the new call (step 62). A service level target value associated with the new call is then retrieved from a memory based on the VDN of the call (step 64). A position for the new call within the queue is then determined based on the service level target value associated with the new call and time in queue values associated with calls already within the queue (step 66). After a queue position has been determined for the new call, the new call is placed in that queue position, and all subsequent calls are moved back one position in the queue.

Figure 5:
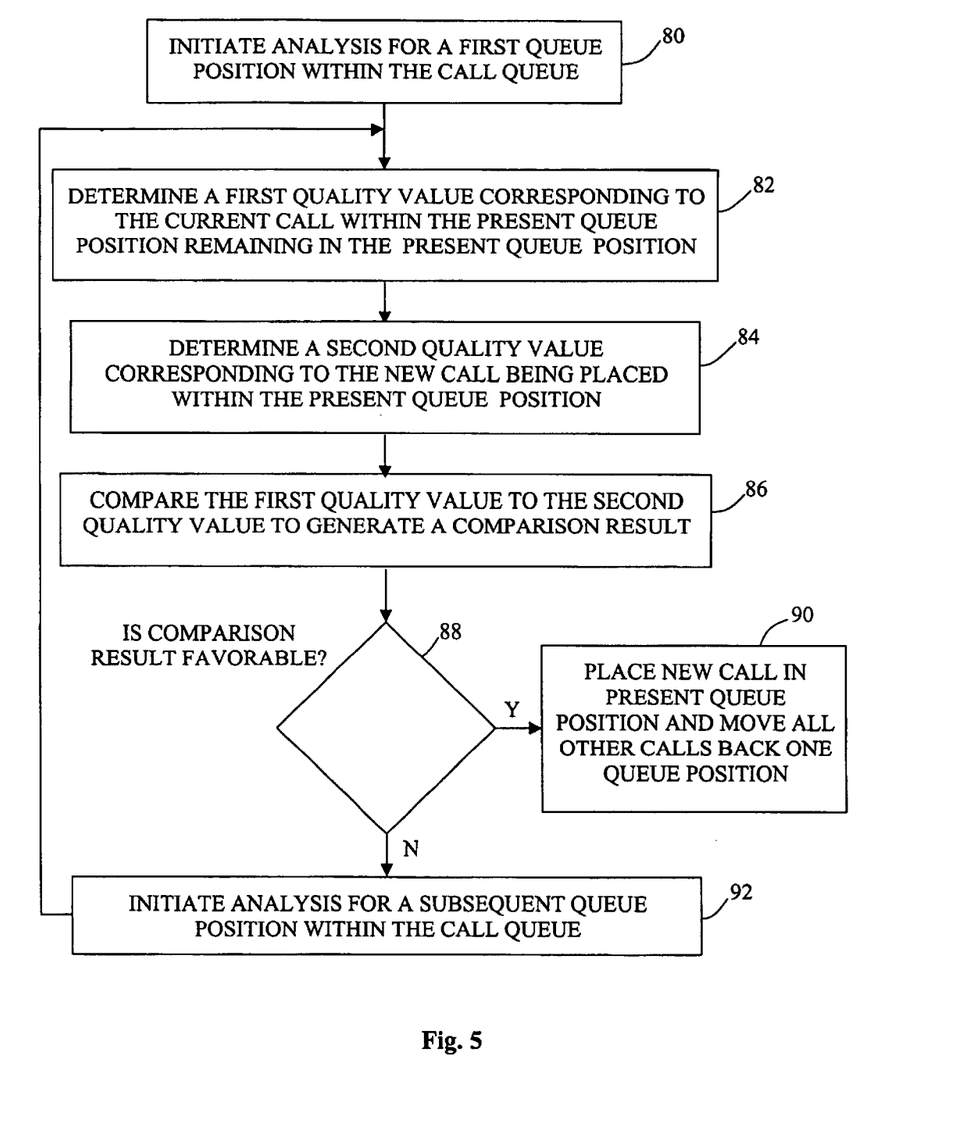
FIG. 5 is a flowchart illustrating a method for determining a queue position within a call queue for a new call received by a call center in accordance with one embodiment of the present invention.

FIG. 5 is a flowchart illustrating a method for determining a queue position within a call queue for a new call received by a call center in accordance with one embodiment of the present invention. First, an analysis is initiated for a first queue position within the call queue to determine whether the new call should be placed within the first queue position (step 80). A first quality value is calculated for the first queue position that corresponds to a situation where a current call within the first queue position remains in the first queue position (step 82). Next, a second quality value is calculated that corresponds to a situation where the new call is placed within the first queue position in place of the current call within this position (step 84). The first and second quality values are each calculated based upon service level objectives and time in queue values associated with the corresponding calls. The first quality value is then compared to the second quality value to generate a comparison result (step 86). If the comparison result is favorable, the new call is placed within the first queue position and all subsequent calls within the queue are moved back one queue position (steps 88 and 90). If the comparison result is not favorable, an analysis is initiated for a subsequent queue position within the call queue (steps 88 and 92). The above-described process is then repeated until a queue position is identified for which the comparison result is favorable. If such a queue position does not exist, the new call is placed at the end of the call queue.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in managing a call queue within a call center, said call queue for handling calls having a plurality of different call types that each have a corresponding service objective value, comprising the steps of:

receiving a new call from an exterior environment, said new call having a first call type;

ascertaining a first service objective value associated with said new call based on said first call type;

selecting a currently enqueued call in the call queue, the currently enqueued call having a second service objective value;

determining a first quality factor assuming that the new call is enqueued after the currently enqueued call;

determining a second quality factor assuming that the new call is enqueued in place of the currently enqueued call, said first quality factor reflecting the first and second service objective values; and comparing the first and second quality factors to determine a position within the call queue for the new call.

2. The method claimed in claim 1, wherein:

in said comparing step, when the second quality factor is less than the first quality factor, the new call is placed in the queue position of the currently enqueued call and the currently enqueued call is moved to a later queue position, and, when the second quality factor is not less than the first quality factor, the new call is not placed in the queue position of the currently enqueued call.

3. The method claimed in claim 2, wherein, when the second quality factor is not less than the first quality factor, the comparing step comprises:

selecting a third call, the third call being currently enqueued, being different from the currently enqueued call, being enqueued in a later queue position than the currently enqueued call, and having an associated third service objective value;

repeating the determining steps substituting the third call for the currently enqueued call.

4. The method claimed in claim 1, wherein:

said step of comparing includes calculating, for the currently enqueued call in a first queue position in said call queue, a ratio $R_{CC}$ between an estimated total time in queue for the currently enqueued call if the currently enqueued call remains in the first queue position and the second service objective value.

5. The method claimed in claim 4, wherein:

said step of comparing includes determining a ratio $R_{NC}$ between an estimated total time in queue for the new call in the first queue position and the first service objective value associated with the new call.

6. The method claimed in claim 5, wherein:

said step of comparing includes determining a ratio $R_{CS}$ between an estimated total time in queue for the currently enqueued call in a subsequent queue position within said call queue and the second service objective value, wherein said subsequent queue position is a next queue position to said first queue position within said call queue.

7. The method claimed in claim 6, wherein:

said step of comparing includes determining a ratio $R_{NS}$ between an estimated total time in queue for the new call in the subsequent queue position and the first service objective value.

8. The method claimed in claim 7 wherein:

said step of comparing includes determining whether said new call should be placed in said first queue position within said call queue based on values for $R_{CC}$, $R_{NC}$, $R_{CS}$, and $R_{NS}$.

9. The method claimed in claim 7 wherein:

said step of comparing includes ascertaining that said new call is to be placed in said first queue position when $|R_{NC}-R_{CS}|<|R_{NS}-R_{CC}|$.

10. The method claimed in claim 1, wherein:

said plurality of different call types includes a plurality of vector directory numbers (VDNs) associated with incoming calls.

11. A computer readable medium comprising instructions to perform the steps of claim 1.

12. A system for use in distributing incoming calls to a plurality of local agents in a call center, said system comprising:

a receiver for receiving incoming calls from an exterior environment;

a call queue unit for use in maintaining a queue of calls to be answered by the plurality of local agents, said queue having a plurality of successive queue positions including an initial queue position, said initial queue position for holding a call that is next in line to be answered by an agent in the plurality of local agents; and a call positioning unit for positioning a new call received by said receiver within the queue, said call positioning unit determining a position within the queue for the new call by determining a first quality factor assuming that the new call is enqueued in a first position in the queue and a second quality factor assuming that the new call is enqueued in a second, different position in the queue and comparing the relative values of the first and second quality factors.

13. The system claimed in claim 12, wherein:

said first and second quality factors are determined using a service objective value associated with the new call.

14. The system claimed in claim 12, wherein:

said call positioning unit determines said position for said new call based on service objective values associated with calls already within the queue.

15. The system claimed in claim 12, wherein:

said call positioning unit includes a comparison unit for comparing the first quality value associated with said new call to the second quality value associated with a current call within a first queue position to determine whether said new call should replace said current call within said first queue position.

16. The system claimed in claim 12, wherein:

said call positioning unit includes an analysis unit for analyzing individual queue positions within said queue, starting with said initial queue position, until a queue position is found that meets a predetermined condition indicating that said new call should replace an existing call within said queue position.

17. A method for use in managing a call queue within a call center, comprising the steps of:
receiving a new call from an exterior environment;
selecting a currently enqueued call in the call queue;
determining a first quality factor assuming that the new call is enqueued after the currently enqueued call;
determining a second quality factor assuming that the new call is enqueued in place of the currently enqueued call; and
comparing the first and second quality factors to determine a position within the call queue for the new call.

18. The method claimed in claim 17, wherein the currently enqueued call has an associated second service objective value, the new call has an associated first service objective value, wherein said call queue handles calls having a plurality of different call types, said new call has a first call type, said currently enqueued call has a second call type, the first service objective value is associated with the first call type, and the second service objective value is associated with the second call type.

19. The method claimed in claim 18, wherein:
said plurality of different call types includes a plurality of vector directory numbers (VDNs) associated with incoming calls.

20. The method claimed in claim 18, wherein, when the second quality factor is not less than the first quality factor, the comparing step comprises:
selecting a third call, the third call being currently enqueued, being different from the currently enqueued call, being enqueued in a later queue position than the currently enqueued call, and having an associated third service objective value;
repeating the determining steps substituting the third call for the currently enqueued call.

21. The method claimed in claim 18, wherein:
said step of comparing includes calculating, for the currently enqueued call in a first queue position in said call queue, a ratio $R_{CC}$ between an estimated total time in queue for the currently enqueued call if the currently enqueued call remains in the first queue position and the second service objective value, wherein the first quality factor is a function of the ratio $R_{CC}$.

22. The method claimed in claim 21, wherein:
said step of comparing includes determining a ratio $R_{NC}$ between an estimated total time in queue for the new call in the first queue position and the first service objective value associated with the new call, wherein the second quality factor is a function of the ratio $R_{NC}$.

23. The method claimed in claim 22, wherein:
said step of comparing includes determining a ratio $R_{CS}$ between an estimated total time in queue for the currently enqueued call in a subsequent queue position within said call queue and the second service objective value, wherein said subsequent queue position is a next queue position to said first queue position within said call queue, wherein the second quality factor is a function of the ratio $R_{CS}$.

24. The method claimed in claim 23, wherein:
said step of comparing includes determining a ratio $R_{NS}$ between an estimated total time in queue for the new call in the subsequent queue position and the first service objective value, wherein the first quality factor is a function of the ratio $R_{NS}$.

25. The method claimed in claim 24, wherein:
said step of comparing includes determining whether said new call should be placed in said first queue position within said call queue based on values for $R_{CC}$, $R_{NC}$, $R_{CS}$, and $R_{NS}$.

26. The method claimed in claim 24, wherein:
said step of comparing includes ascertaining that said new call is to be placed in said first queue position when $|R_{NC} - R_{CS}| < |R_{NS} - R_{CC}|$.

27. The method claimed in claim 17, wherein:
in said comparing step, when the second quality factor is less than the first quality factor, the new call is placed in the queue position of the currently enqueued call and the currently enqueued call is moved to a later queue position, and, when the second quality factor is not less than the first quality factor, the new call is not placed in the queue position of the currently enqueued call.

28. A computer readable medium comprising instructions to perform the steps claimed in claim 17.

29. The method claimed in claim 17, wherein, after the comparing step, the currently enqueued call is relocated to a different queue position, and the determined queue position for the new call is closer to a head of the call queue than the relocated queue position for the currently enqueued call.

* * * * *